(12) United States Patent  (10) Patent No.: US 7,669,796 B2
Nachbar  (45) Date of Patent: Mar. 2, 2010

(54) HOOP STRESS REDUCTION IN A BUOYANT AIRSHIP

(76) Inventor: Daniel Nachbar, 110 Pulpit Hill, Amherst, MA (US) 01022

( * ) Notice: Subject to any disclaimer, the term of this patent is extended or adjusted under 35 U.S.C. 154(b) by 128 days.

(21) Appl. No.: 11/135,555

(22) Filed: May 24, 2005

(65) Prior Publication Data
US 2006/0266886 A1    Nov. 30, 2006

(51) Int. Cl.
B64B 1/06    (2006.01)
B64B 1/58    (2006.01)

(52) U.S. Cl. .................................. 244/30; 244/128
(58) Field of Classification Search ............... 244/30, 244/97, 98, 125, 126, 128
See application file for complete search history.

(56) References Cited

U.S. PATENT DOCUMENTS

| 13,548 | A | * | 9/1855 | Gammeter | 128/96.1 |
|---|---|---|---|---|---|
| 1,577,756 | A | * | 3/1926 | Reagan | 244/97 |
| 1,580,182 | A | * | 4/1926 | Van Valkenberg | 244/125 |
| 1,689,184 | A | * | 10/1928 | Schoettel | 244/128 |
| 1,700,096 | A | * | 1/1929 | Liebert et al. | 244/97 |
| 3,620,485 | A | * | 11/1971 | Gelhard et al. | 244/29 |
| 4,032,085 | A | * | 6/1977 | Papst | 244/30 |
| 5,538,203 | A | * | 7/1996 | Mellady | 244/97 |
| 6,427,943 | B2 | * | 8/2002 | Yokomaku et al. | 244/30 |
| 6,698,686 | B2 | * | 3/2004 | Ogawa et al. | 244/30 |
| 7,156,342 | B2 | * | 1/2007 | Heaven, Jr. et al. | 244/30 |

* cited by examiner

Primary Examiner—Rob Swiatek
(74) Attorney, Agent, or Firm—Daniel S. Coolidge

(57) ABSTRACT

A system and method for equalizing internal and external pressure on an enclosed vessel moving through a gas or fluid is described, thereby reducing hoop stresses imposed on the vessel by pressure differentials. The vessel is divided into multiple chambers, and the internal pressure of a chamber may be equalized with an external pressure proximate the chamber through the use of a valve or controllable vent.

7 Claims, 5 Drawing Sheets

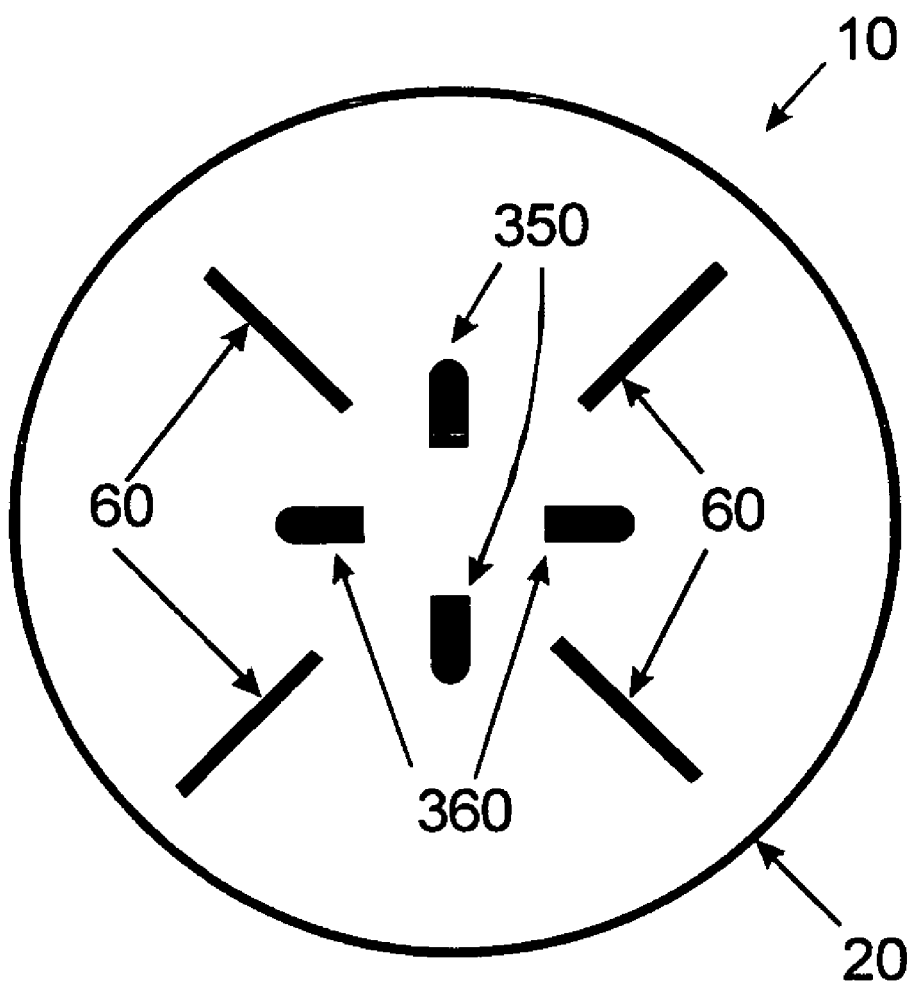

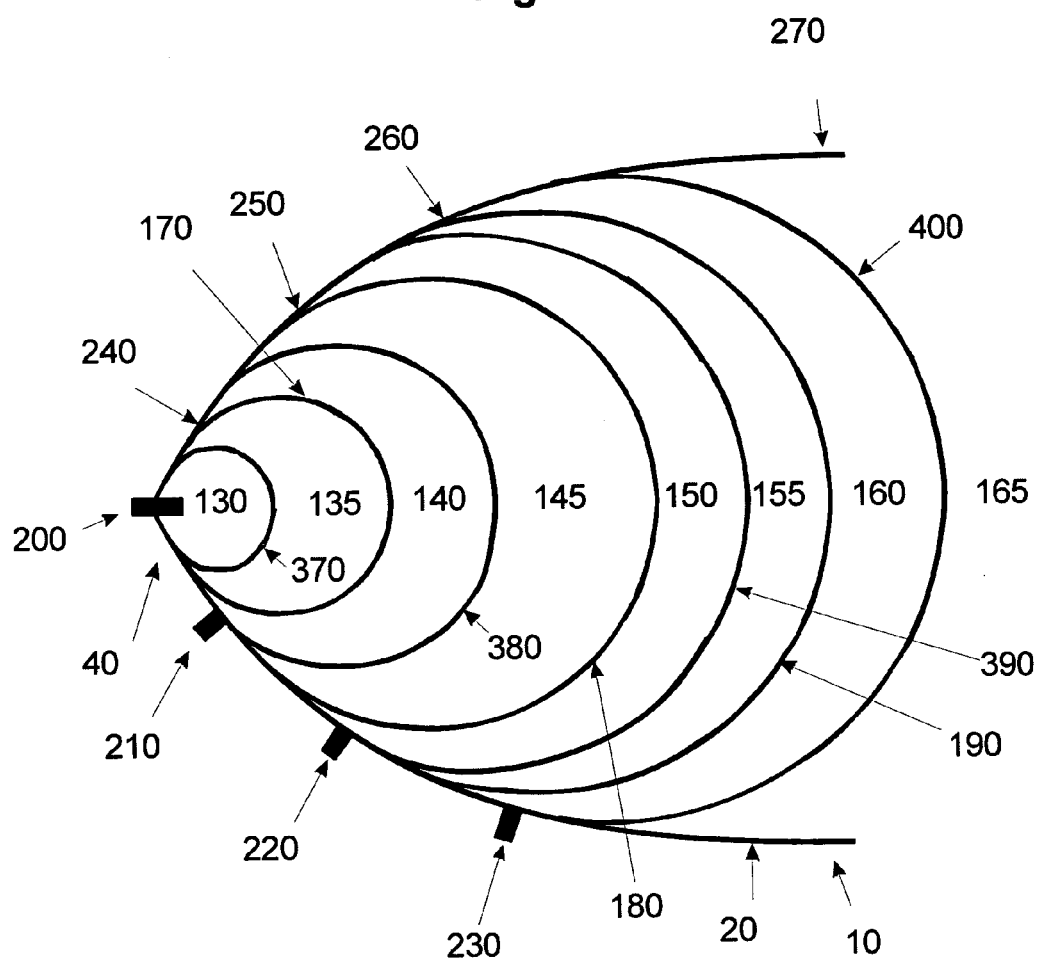

HOOP STRESS REDUCTION IN A BUOYANT AIRSHIP

TECHNICAL FIELD

This invention relates to reducing stresses induced on a flexibly covered vessel moving through a gas or fluid, and more particularly to reducing hoop stress in a buoyant airship.

BACKGROUND

The stresses on an airship envelope, both on the supporting members and on the envelope fabric, come in two varieties: hoop stress and suspension stress.

Hoop stress is the stress on the walls of a container, typically having a generally cylindrical cross section, when the pressure inside the container exceeds the pressure outside. This stress tends to cause the container to burst. The name comes from the hoops found on wooden barrels that are used to hold in the staves and withstand this type of stress.

It is a well established fact of mechanics that the magnitude of hoop stress increases linearly with the diameter of the cylinder as well as linearly with the pressure difference between the inside and outside.

Suspension stresses are essentially the inverse of hoop stresses. These stresses arise when the pressure outside the container exceed the pressure inside, with the pressure tending to make the container collapse or implode. As with hoop stress, the magnitude of suspension stresses increases linearly with the pressure difference between the inside and outside. The relationship between the diameter of the container and the suspension stress is not as straightforward and not particularly relevant to the discussion here.

For a conventional pressurized airship at rest, all of the stresses on the envelope are the hoop stress. Further, these hoop stresses are greatest at the point of maximum diameter—typically at a point generally midway between the nose and tail of the ship.

At rest, the pressure distribution along the outside of an airship is at a uniform, ambient level. This pressure distribution changes as the airship starts to move through the air. However, the changes in external pressure are not straightforward. In fact, the pressure along the surface varies continuously along the direction of motion, typically parallel with the longitudinal axis of the envelope. At some points, pressure increases to a level greater than the ambient pressure. These are called "positive" aerodynamic forces. At other points, the pressure decreases to levels lower than the ambient pressure. These are called "negative" aerodynamic pressures. They are also sometimes referred to as "suction."

As with all aerodynamic forces, the pressures created (both positive and negative) increase in magnitude as the square of the velocity of the airship. So, when the speed of the craft is doubled, the resulting stresses (both hoop and suspension) increase by a factor of 4.

At the forward-most location, typically the very nose of the ship (called the forward stagnation point,) the outside pressure increases well above the ambient pressure and thus produces more of an inward (positive) force. In a conventional pressurized envelope, this positive pressure actually reduces hoop stress on the nose portion of the envelope. In fact, at a high enough airspeed, the positive pressure will exceed the internal gas pressure making the nose of the envelope want to buckle inward. At such a high speed, the nose ceases to sustain hoop stress and starts to sustain suspension stress.

The positive (inward) pressure created by the airflow is at its greatest at the nose of the ship. As the air flows back along the outside of the envelope, the magnitude of the inward force rapidly decreases. In fact, by the time the airflow is typically about one tenth of the way back towards the tail (i.e. 10% of the way along the direction of motion, typically the longitudinal axis,) the relatively positive pressure completely disappears. This creates a zero-crossing point where the external pressure remains essentially unchanged at the initial, ambient atmospheric level.

As the airflow continues along the outside of the envelope, the pressure continues to decrease, and can reach a level below the ambient level and thus create a negative (outward or aerodynamic stress which increases the hoop stress on the envelope material.

At the widest part of the ship (typically about halfway between nose and tail) the magnitude of the change pressure is between one half and one third of that found the nose of the ship—but obviously in the opposite direction.

After the midpoint of the ship, the airflow start to re-converge and likewise the external pressure starts to return to ambient (the magnitude of the suction decreases.) Depending upon the exact shape of the tail of the ship and other factors, the air pressure may remain slightly on the side of suction, drop to essentially ambient pressure, or cross back over to a positive pressure at the tail. The stresses along the tail are much smaller in magnitude (and thus much easier to support structurally) than the stresses on the nose and around the middle of the ship.

It is most inconvenient that in a typical lighter-than-air airship reduction in ambient pressure (with respect to the internal pressure) created by the airflow is greatest around the middle of the ship, just where the hoop stress is already relatively highest due to the larger diameter of the ship at that point.

The problem of hoop stress is quite severe for designs that use the conventional method of deliberately increasing the internal pressure of the envelope (so-called pressure ships) in order to provide structural support for the envelope. Since the hoop stress is linearly related to the difference in pressure between the inside and the outside of the envelope, increasing the internal pressure must necessary increase the hoop stress by a comparable amount. By using a structurally reinforced envelope, hoop stresses may be reduced compared to a pressure ship design since the pressure inside the envelope doesn't need to be artificially increased above the ambient level in order to have the envelope retain its shape. Adding structural elements to stiffen the envelope also, unfortunately, adds weight to the airship.

What is needed is a way to minimize the stresses induced by pressure differentials between the internal and external sides of a flexibly covered vessel in motion while at the same time minimizing the weight of the vessel.

BRIEF SUMMARY

The invention described includes, in one embodiment, a system and method for reducing hoop stresses in an enclosed vessel using a plurality of gas tight chambers connected to the outside of the enclosed vessel with vents. The vents may include controls to open and close them. Chambers may enclose any of a number of lighter-than-air gases, such as steam, helium or hydrogen. Chambers may alternately contain lighter than air gases and ordinary air. Chambers may also contain a ballonet.

The vessel may be enclosed by a rigid or flexible skin.

The details of one or more embodiments of the invention are set forth in the accompanying drawings and the descrip-

DESCRIPTION OF DRAWINGS

FIGS. 5 and 6 show arrangements of cycloidal thrusters on the tail of an airship.

FIG. 7 shows an alternative arrangement of pressure equalization chambers.

Like reference symbols in the various drawings indicate like elements.

DETAILED DESCRIPTION

Figure 1:
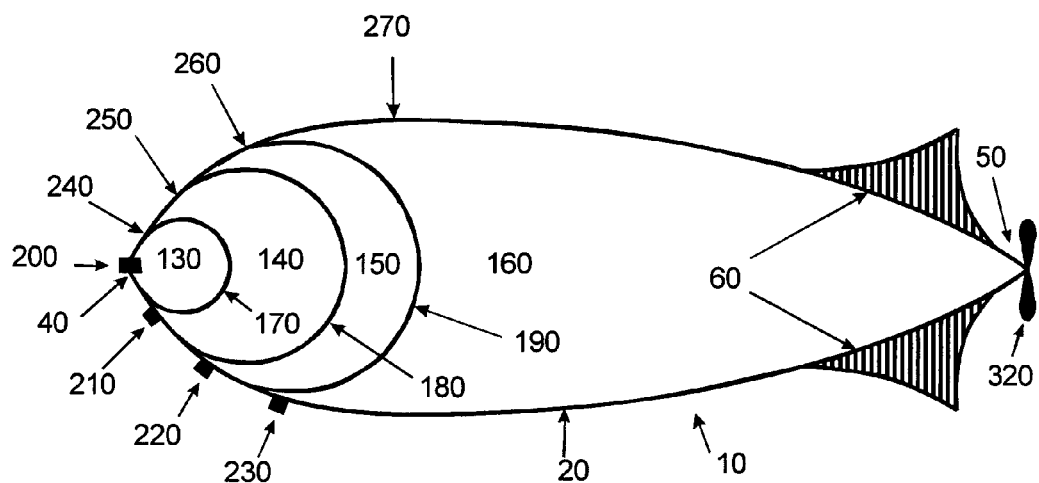
FIGS. 1 and 1B are cross sectional views along the longitudinal axis of a vessel.

The invention takes advantage of the fact that a vent hole placed on the surface of a flexibly covered vessel will naturally allow pressure differentials caused by motion of the vessel to equalize at the location of the vent hole by permitting gas to enter and/or exit the enclosed vessel. Since the external pressure changes as the speed of the aircraft increases, the internal pressure will correspondingly change as well.

For purposes of description, we will use a generally cigar shaped cylindrical vessel with a flexible skin or envelope, such as a blimp or dirigible, but it may be seen by one skilled in the art that the invention may be beneficially used with other shaped vessels, including irregularly shaped vessels.

With a single vent hole, location poses a problem. The vent hole might be placed at the widest point of the vessel, since this is the point of maximum negative aerodynamic pressure (suction). Such a mid-ship vent will cause the internal envelope pressure to be less than or equal to the external pressure over the entire surface of the envelope. As such, all hoop stress along the envelope will be eliminated. However, in this case the hoop stress will be replaced by suspension stresses on all parts of the envelope except the very middle.

If the single vent hole were to be placed at the half way point between the nose and the middle of the ship (say at the 25% point on the longitudinal axis) then the internal pressure drop would be about half that created by the first example (a vent at the midpoint). In this configuration, the first 25% of the ship would be under inward pressure (suspension stress) and the rest of the ship would be under outward pressure.

In fact, one can obtain any desired level of internal pressure drop merely by placing a vent hole at the appropriate location between the zero crossing point (which as mentioned earlier is located near the 10% point along the longitudinal axis) and the mid-point of the ship. If the vent hole were placed anywhere between the zero-crossing point and the very nose of the ship, then the internal pressure would rise rather than fall as the aircraft started to move through the air.

In the extreme, one could place the vent on the very nose of the ship. In such an arrangement a net positive (outward) pressure would exist over the entire surface of the craft. As such it would place all of the fabric under hoop stress, no matter what airspeed the airship obtained. Note that this differs from the situation of a conventional pressurized envelope where the hoop stresses on the nose is reduced with increased airspeed.

The choice of vent location causes the pressure inside the envelope to match pressure outside the envelope at the point of the vent. It is important to note that this pressure matching is accomplished without any moving parts or active control. Changes in external pressure are communicated to the inside of the vessel through the vent hole. The airflow itself causes the internal pressure to change.

While the clever placement of a single vent hole allows some control the stresses placed on the fabric, further gains may be achieved by using one or more diaphragms (or bulkheads) oriented generally perpendicularly to the central axis of the ship that divide the internal space into two or more longitudinally separate chambers and then having one vent hole for each chamber. In this manner, the internal pressure of each chamber can be made to more closely match the external pressure outside each particular chamber.

One simple case of a multi-chamber design would be to implement a bubble-shaped chamber in the nose of the ship in the manner similar to the one described by Papst (U.S. Pat. No. 4,032,085). Papst locates a vent hole on the very front of the ship. As a result, the pressure inside nose chamber is thus always greater than the pressure on the outside of the chamber.

An important feature to note about the Papst-style bubble is that it is shaped roughly as a hemi-sphere that is embedded inside the cone shape of the nose. In this configuration, the walls of the sphere join the surface of the envelope at a tangent. Since flexible structural members such as fabric can only place forces on other elements along their plane, the forces that the chamber walls place on the outside envelope are essentially along the plane of the envelope fabric. Thus, the sphere-shaped chamber does not exert any inward pressure on the envelope. As a result, the only structural cost of adding such a chamber is the cost (weight etc) of the chamber fabric itself. It is not necessary to increase the size of ribs of the envelope or add any other structural members to the envelope design.

Because the external pressures vary continuously as one moves longitudinally along the external surface of the vessel in motion, it is never possible to exactly match the internal and external pressure at all points. Thus it is never possible to completely eliminate all aerodynamically induced stresses on the fabric.

In the limit, scores of chambers could be created so that the pressure inside each chamber very closely matches the outside chamber. However, each additional chamber increases the envelope weight and creates difficulties in heating the lifting gas (for a hot air airship.) Further, each additional subdivision of the internal space creates a smaller absolute improvement in pressure matching. There is a point at which adding more chambers costs more than it is worth.

In the discussion above, we have referred to the flow of air through the vent holes directly into the internal chambers in order to equalize the internal and external pressures. This is fairly straightforward approach for airships that use ordinary air as their lifting gas. However, the same pressure matching mechanism may be applied to other lifting, gases such as helium, hydrogen, steam, ammonia-based or any other choice of lifting gas. One needs only add a conventional "ballonet" or bladder connected to the vent hole rather than to the chamber as a whole. Each chamber would have its own bladder which would expand and contract with the pressure changes. The pressure change in the bladder would then be transferred to the chamber as a whole.

For cases where the external pressure is less than the internal pressure, there would need to be some form of diaphragm that would be drawn outward in order to lower the internal pressure appropriately. In detail, the invention includes a conventional fabric envelope containing a gas that is less dense than the surrounding atmospheric gases. The invention provides a means to reduce both the lateral (hoop) and longitudinal mechanical stresses placed on the envelope material.

One embodiment provides a series of nested air chambers and vents of the type first proposed by Papst. However, whereas Papst used only a single chamber in the nose of the aircraft, the present invention utilizes a series of such chambers. Each chamber is equipped with a vent that connects it to the surrounding atmosphere. The vents are situated longitudinally such that the pressure in the associated chamber varies with pressure changes that arise on the surface outside that particular chamber. The pressure inside some of the chambers rises with an increase in forward airspeed. The pressure inside other chambers falls with an increase in forward airspeed. The pressure in still other chambers will remain near the ambient pressure level and will be essentially unaffected by changes in airspeed.

The boundary of each chamber is defined in part by the envelope fabric and in part place by membranes that are inside the envelope volume. These internal membranes are constructed of flexible gas-tight fabric. The internal membranes are spherical in shape and terminate at the envelope wall. The internal membranes are sized so as to meet the envelope wall as a very shallow angle. Essentially, the internal membranes will meet the envelope wall at a tangent.

Since the chambers are flexible structural members place in tension, they can only apply force to other structural member along the plane of the material. Since the fabric of the internal members attaches to the envelope fabric at a tangent, then the forces transmitted from the membranes to the envelope will be transmitted in plane with the envelope fabric. As a result, there will be no tendency for the membranes to pucker, buckle or otherwise pull the envelope inward or outward. In fact, because there is essentially no change in the external aerodynamic behavior of the airship (except for the negligible changes caused by the vents) there is no net change in the longitudinal stresses placed on the envelope.

In yet another embodiment, the invention further comprises a series of struts attached to the envelope at the aerodynamic zero-crossing point near the nose of the vessel. This has the effect of relieving the envelope components of the longitudinal oriented stresses at the nose.

The longitudinally oriented loads are carried to the nose struts 280 and then to a central structural member 30 that runs the entire length of the airship. The struts may be hinged at the point where they attach to the central structural member 30. Each nose strut 280 is limited from spreading outward beyond a certain point by a flexible tensioning member 290, such as a wire rope, connected at one end to the outer end of the nose strut 280. The other end of the flexible tensioning member 290 is attached to the central structural member 30. The nose radial member 300 can attach to the central tensioning member 30 at any number of longitudinal points along the central tensioning member 30 including a point 310 as to make it oriented perpendicularly to the central tensioning member 30, the very nose of the ship 40, or it can attach somewhere between those two points.

The central structural member carries the aerodynamic forces from the nose in column to the thrusting force located on the tail. Forward thrust is provided by a propulsion means located at the tail of the ship. Thus the primary main thrust and drag loads are carried longitudinally by the central tensioning member rather than by the envelope material.

The central structural member is stiffened against buckling and/or bending by one or more sets of radially oriented struts located longitudinally along the central tensioning member. These radially oriented struts are themselves supported longitudinally by guy wires running to the nose and tail. This structure is very similar to the spreaders and guys that are routinely used to stiffen sailboat masts. The radial struts are supported laterally by attaching them to the envelope materials preferably linking them to the ribs of a foldable envelope structure. (Note: The lateral loads that the radial struts place on the envelope are very small in contrast to the longitudinal loads the support.) Alternatively, the radial struts and associated guy wires can be supported laterally by attaching the guy wires to the nose struts and/or tail fin struts.

The truss structure formed by the central structural member, radial struts and guy wires not only supports the compressive longitudinal compressive loads but also carries the bending moments and associated stresses placed on the envelope. When a bending moment is placed on the entire ship, it is transferred to the central structural member where it attaches to the nose and tail of the envelope and/or by the nose struts and tail fin struts. The bending moment is then is carried as tension in the guy wires and as compression in the radial struts and the central structural member.

In addition to the nose struts located at the aerodynamic zero-crossing point, one or more additional sets of struts may be located at the longitudinal points near the nose to transfer even more loads to the central structural member. Similarly, one or more additional sets of struts, comparable to the nose struts, can be added to the tail end of the vessel in order to carry loads from an even larger portion of the envelope to the central structural member.

As mentioned above, the magnitude and direction (positive or negative) of the aerodynamically induced air pressure changes is determined by the shape of the envelope. On some envelopes there is a second zero-crossing point beyond which (and typically continuing to the tail) the aerodynamically induced pressures once again become positive. In such cases, a series of 1 or more chambers, comparable to the chambers implemented at the nose of the ship can be implemented in the tail of the ship to relieve the stresses created by these positive aerodynamically induced pressures on the tail area of the ship.

It is important to note that the precise placement of the membranes and their associated vents needs to take into account not only the aerodynamic pressures created during straight flight, but also the aerodynamic pressures created during maneuvers such turning, climbing, and descending. It is also useful to note that the hoop stress created in the material of a spherically membranes is roughly ½ of the stress created on the wall of a cylindrical container. Therefore, the spherically shaped internal membranes can withstand a pressure differential of nearly twice as much as the roughly cylindrical shaped envelope section of the same area and strength of fabric.

Another extension of the invention utilizes cycloidal propellers instead of conventional propellers. The propellers are arranged in 2 sets of 4 propellers each. One set is on the nose of the aircraft, the other set is on the tail of the aircraft. The propellers serve both to thrust for propulsion as well as thrust for position control during hovering operations.

During forward flight, all of the propellers 330, 340, 350 and 360, direct their thrust rearward. The propellers on the stern 350 and 360 propel the airship forward in a more or less conventional fashion. The propellers on the nose 330 and 340 are oriented such that their angle of rotation is perpendicular to the surface of the envelope. Since cycloidal propellers move air in a direction that is perpendicular to their axis of rotation, this arrangement will case the airflow put out by the propellers (sometimes called the "prop wash") to move in a direction that is parallel to the surface of the airship. Thus, in forward flight, the prop wash will flow in a direction that is more or less parallel to the surface of the envelope. As a result, the airstreams along the forward part of the ship are accelerated much more quickly than if the nose propellers 330 and 340 were not in operation. As described by the well-known Bernoulli effect, any increase in the speed of an airstream will create a compensating drop in the pressure that the airstream applies to the surface over which it is passing. So in this case, the increased speed of the air stream over the nose of the airship 40 will necessarily lead to a reduction in the positive aerodynamic forces applied to the envelope 20 surface at the nose 40 of the airship 10.

It is beneficial to provide structural support of the envelope other than merely conventional internal air pressure. Otherwise, the airflow could wildly distort the envelope and destroy the pressure gradient described above. An advantage of the present invention is that the forces on this underlying support structure may be reduced by matching the internal and external pressures.

Figure 1B:
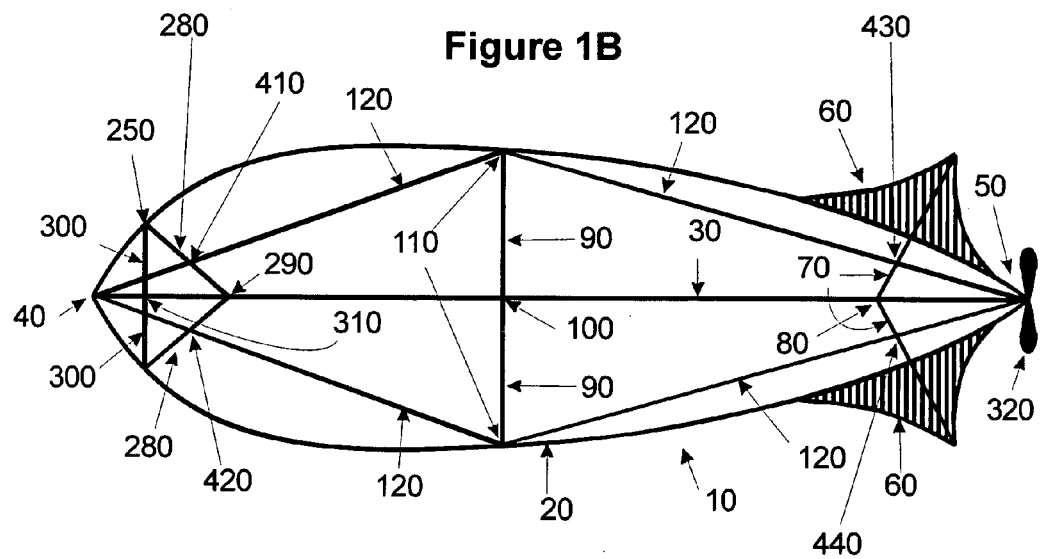
Figure 2:
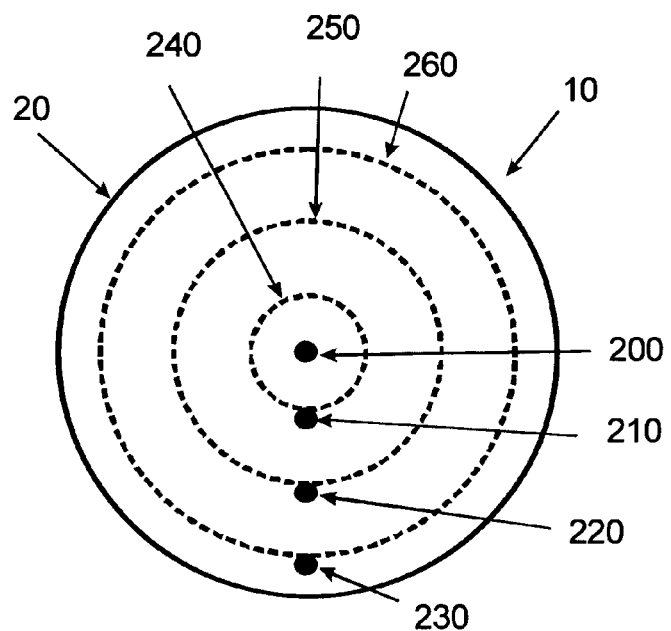
FIG. 2 is a cutaway view of the nose of a vessel.

Referring to FIGS. 1 and 1B, a longitudinal cross sectional view of a vessel 10 is shown. An envelope 20 is used to retain the internal gas, such as a lifting gas. A central structural member (30) runs along the central axis of the airship connecting the front end 40 and tail end 50. A propulsion means 320 is provided on the tail end 50. Tail fins 60 are supported by tail fin struts 70. The tail fin struts attach to the central structural member 30 at the tail fin joint 80. In a foldable design, the tail fin joint 80 would be hinged and/or capable of sliding longitudinally along the central structural member 30.

Radial members 90 attach to the central structural member 30 at a radial member joint 100. In a foldable design, the radial member joint 100 is hinged and/or capable of sliding longitudinally along the central structural member 30. The radial members 90 optionally obtain lateral support by attaching to the envelope 20 at their outer ends 110. In a foldable design, the joints at the outer ends 110 of the radial members 90 are hinged and/or capable of sliding longitudinally along the surface of the envelope 20.

In one embodiment, the joint at the outer ends 110 of the radial members 90 attaches to the envelope 20 along adjacent to the flexible members of a foldable ribbed envelope as described in Nachbar U.S. Pat. No. 6,793,180. Outer members 120 connect the outer ends 110 of the radial members 90 to the central structural member 30 at the front end 40 and tail end 50.

In one embodiment, the outer members 120 are flexible rope, cable or line. In a foldable design where the outer members 120 at the front end 40 or tail end 50 are attached directly to the envelope 20 rather than the central structural member 30, the lengths of the outer members 120 must be length adjustable.

An alternative approach to obtaining lateral support for radial members 90 and outer members 120 is to attach the outer members 120 to the nose members 280 at the outer member nose intersections 410 and 420. Similarly, the outer members 120 can obtain lateral support by attaching to the tail fin struts 70 at the outer member tail intersections 430 and 440.

The volume inside the envelope 20 is separated into the nose chamber 130, intermediate chamber 140, ambient chamber 150, and main chamber 160. The nose chamber 130 is separated from the intermediate chamber 140 by a nose membrane 170. The intermediate chamber 140 is separated from the ambient chamber 150 by the intermediate membrane 180. The ambient chamber 150 is separated from the main chamber by the ambient membrane 190. In one embodiment, the nose membrane 170, intermediate membrane 180, and ambient membrane 190 are all generally spherically shaped and attach to the envelope 20 as closely to a tangent as practical.

In another embodiment, the nose membrane 170 attaches to the envelope 20 at the half maximum aerodynamic pressure point 240 along the longitudinal axis of the envelope 20 where the aerodynamically induced pressures due to forward motion of the airship 10 through the surrounding atmosphere is approximately one half of the aerodynamically induced pressure on the nose of the airship 10.

In yet another embodiment, the intermediate membrane 180 attaches to the envelope 20 at the aerodynamic pressure zero-crossing point 250 along the horizontal axis of the envelope 20 where the aerodynamically induced pressures due to forward motion of the airship 10 through the surrounding atmosphere are minimal.

In yet another embodiment, the ambient membrane 180 attaches to the envelope 20 at the half suction point 260 along the horizontal axis of the envelope 20 where the aerodynamically induced pressure decrease due to forward motion of the airship 10 through the surrounding atmosphere is approximately one half of the magnitude of the most extreme negative aerodynamic pressure.

The nose chamber 130 is connected to the surrounding atmosphere via the nose vent 200. The construction and positioning of the nose vent 200 are such that any change in the airspeed of airship 10 will create an aerodynamically induced pressure change at the nose vent 200. When the ship is not moving with respect to the surrounding atmosphere, there will be no aerodynamically induced pressure change at the point of the nose vent 200. An increase in airspeed of the airship 10 will cause an increase in the aerodynamically induced pressure at the point of the nose vent 200. Likewise, a decrease in airspeed will cause the aerodynamically induced pressure at the point of the nose vent 200 to decrease. Any change in the aerodynamically induced pressure change will cause air to flow through the nose vent 200 until the pressure inside the nose chamber 130 is approximately equal to the external pressure at the nose vent 200. As such the air pressure in the nose chamber 130 is kept nearly equal to the external pressure at the nose vent 200. The difference in pressure between nose chamber 130 and the surrounding atmosphere increases gradually as one moves longitudinally along the outer surface of the envelope 20 from the front end 40 in the direction of the tail end 50. The pressure difference between nose chamber 130 increases until the point where the nose membrane 170 joins the envelope 20.

This approximate matching of the aerodynamically induced pressures outside the envelope 20 with the pressure inside the nose chamber significantly reduces mechanical stresses in the portion of the envelope 20 that separates the nose chamber from the surrounding atmosphere.

The intermediate chamber 140 is connected to the surrounding atmosphere via the intermediate vent 210. The construction and positioning of the intermediate vent 210 is such that the aerodynamically induced pressure changes at the point of the intermediate vent 210 created by the airship 10 moving through the surrounding atmosphere are approximately equal to the aerodynamic induced pressure changes at the point along the envelope 20 where it attaches to the nose membrane 170. When the ship is not moving with respect to the surrounding atmosphere, there will be no aerodynamically induced pressure changes at the point of the intermediate vent 210. An increase in airspeed will cause an aerodynamically induced pressure increase at the point of the intermediate vent 210. Likewise, a decrease in airspeed will cause the aerodynamically induced pressure at the point of the intermediate vent 210 to decrease. Any change in the aerodynamically induced pressure will cause air to flow through the intermediate vent 210 until the pressure inside the intermediate chamber 140 is approximately equal to the external pressure at the intermediate vent 210. As such, the air pressure in the intermediate chamber 140 is kept nearly equal to the external pressure at the intermediate vent 210. It should be noted that the aerodynamically induced pressure continuously and gradually decreases between the half maximum aerodynamic point 240 where the nose membrane 170 attaches to the envelope 20 and the aerodynamic pressure zero-crossing point 250 where the intermediate membrane 180 attaches to the envelope 20. However, the pressure inside the intermediate chamber 140 is constant over its entire volume. As a result, while there is essentially no difference between the pressure inside the intermediate chamber 140 and the pressure outside the envelope 20 at the half maximum aerodynamic point 240, there is a gradually increasing pressure differential as the airflow accelerates along the surface of the envelope 20 from the aerodynamic zero crossing point 240 to the aerodynamic pressures zero-crossing point 250. Nonetheless, the pressure inside the intermediate chamber 140 remains fairly closely matched to the pressure outside between the aerodynamic half maximum aerodynamic pressure point and the 240 and the aerodynamic pressure zero-crossing point 250. This approximate matching of the aerodynamically induce pressures outside the envelope 20 with the pressure inside the intermediate chamber 140 significantly reduces mechanical stresses in the portion of the envelope 20 that separates the intermediate chamber 140 from the surrounding atmosphere.

When in straight flight, the magnitude of the aerodynamically induced pressure change at the intermediate vent 210 will always be less than the magnitude of the pressure change induced at the nose vent 200. Therefore, the gas pressure in the nose chamber 130 will always be greater than or equal to the absolute pressure in the intermediate chamber 140. As a result, the nose membrane 170 can be effectively implemented via a lightweight, flexible material such as fabric.

The ambient chamber 150 is connected to the surrounding atmosphere via the ambient vent 220. The construction and positioning of the ambient vent 220 is such that the aerodynamically induced pressure changes at the point of the ambient vent 220 created by the airship 10 moving through the surrounding atmosphere are minimized and if possible, eliminated. An increase in airspeed will cause little if any aerodynamically induced pressure increase at the point of the ambient vent 220. Likewise, a decrease in airspeed will cause little if any aerodynamically induced pressure decrease at the point of the ambient vent 220. Air will flow through the ambient vent 220 as a result in any change in the ambient pressure of the surrounding atmosphere until the pressure inside the ambient chamber 150 is approximately equal to the ambient pressure. As such the air pressure in the ambient chamber 150 is kept nearly equal to the ambient pressure. It should be noted that the aerodynamically induced pressure continuously and gradually decreases between the aerodynamic zero-crossing point 250 where the intermediate membrane 180 attaches to the envelope 20 and the half suction point 260 where the ambient membrane 190 attaches to the envelope 20. However, the pressure inside the ambient chamber 150 is constant over its entire volume. As a result, while there is essentially no difference between the pressure inside the ambient chamber 150 and the pressure outside the envelope 20 at the aerodynamic zero-crossing point 250, there is a gradually increasing pressure differential as the airflow accelerates along the surface of the envelope 20 from the aerodynamic zero-crossing point 250 to the half suction point 260. Nonetheless, the pressure inside the ambient chamber 150 remains fairly closely matched to the pressure outside between the aerodynamic zero-crossing pressure point and the 250 and the half suction point 260. This approximate matching of the aerodynamically induced pressures outside the envelope 20 with the pressure inside the ambient chamber 150 significantly reduces mechanical stresses in the portion of the envelope 20 that separates the ambient chamber from the surrounding atmosphere.

When in straight flight, the magnitude of the aerodynamically induced pressure change at the ambient vent 220 will always be less than the magnitude of the pressure change induced at the intermediate vent 200. Therefore, the gas pressure in the intermediate chamber 140 will always be greater than or equal to the absolute pressure in the ambient chamber 150. As a result, the intermediate membrane 170 can be effectively implemented as a lightweight, flexible material such as fabric.

The main chamber 160 is connected to the surrounding atmosphere via the main vent 230. The construction and positioning of the main vent 230 is such that the aerodynamically induced pressure changes at the point of the main vent 230 that is created by the airship 10 moving through the surrounding atmosphere is approximately one half of the magnitude of the aerodynamically induced pressure drop created along the envelope at the point of maximum suction 270. When the vessel is not moving with respect to the surrounding atmosphere, there will be no aerodynamically induced pressure change at the point of the main vent 230. An increase in airspeed will cause an aerodynamically induced pressure drop at the point of the main vent 230. Likewise, a decrease in airspeed will cause the aerodynamically induced pressure drop at the point of the main vent 230 to decrease. Any change in the aerodynamically induced pressure will cause air to flow through the main vent 230 until the pressure inside the main chamber 160 is approximately equal to the external pressure at the main vent 230. As such the air pressure in the main chamber 160 is kept nearly equal to the external pressure at the main vent 230. It should be noted that the aerodynamically induced pressure continuously and gradually decreases between the half suction point 260 where the ambient membrane 190 attaches to the envelope 20 and the point of maximum suction 270. However, the pressure inside the main chamber 160 is constant over its entire volume. As a result, while there is essentially no difference between the pressure inside the main chamber 160 and the pressure outside the envelope 20 at the half suction point 260, there is a gradually increasing pressure differential as the airflow accelerates along the surface of the envelope 20 from the half suction point 260 to the point of maximum suction 260. As the airflow starts to decelerate after is passes the point of maximum suction 270 until it reaches the tail end 50. As a result, the pressure difference is at its greatest at the maximum suction point 270 and gradually and continuously decreases towards the tail 50. Nonetheless, the pressure inside the main chamber 150 is, overall, fairly closely matched to the pressure outside between the point of maximum suction 270 and the tail 50. This approximate matching of the aerodynamically induced pressure changes outside the envelope 20 with the pressure inside the main chamber 160 significantly reduces mechanical stresses in the portion of the envelope 20 that separates the main chamber from the surrounding atmosphere.

Nose struts 280 attach to the central structural member 30 at the nose strut joint 290. In a foldable design, the nose strut joint 290 will be hinged and/or capable of sliding longitudinally along the central structural member. The nose struts 280 attach to the envelope 20 at the aerodynamic pressure zero-crossing point 250. In a foldable design, the attachment between the nose strut 280 and the envelope 20 will be hinged and/or capable of sliding longitudinally along the envelope. In one embodiment, the nose struts 280 will attach to a foldable, ribbed envelope as described in U.S. Pat. No. 6,793,180 along one of the ribs of the envelope.

Nose radial members 300 attach to the central structural member at the nose radial joint 310. In a foldable design, the nose radial joint will be hinged and/or capable of sliding longitudinally along the central structural member. The nose radial members 300 will attach to the envelope 20 at the aerodynamic pressure zero-crossing point 250. In a foldable design the attachment point between the nose radial members 300 and the envelope 20 will be hinged and/or capable of sliding longitudinally along the envelope 20. In one embodiment, the nose radial members will only be under tension and may thus be realized as a rope or cord.

Figure 3:
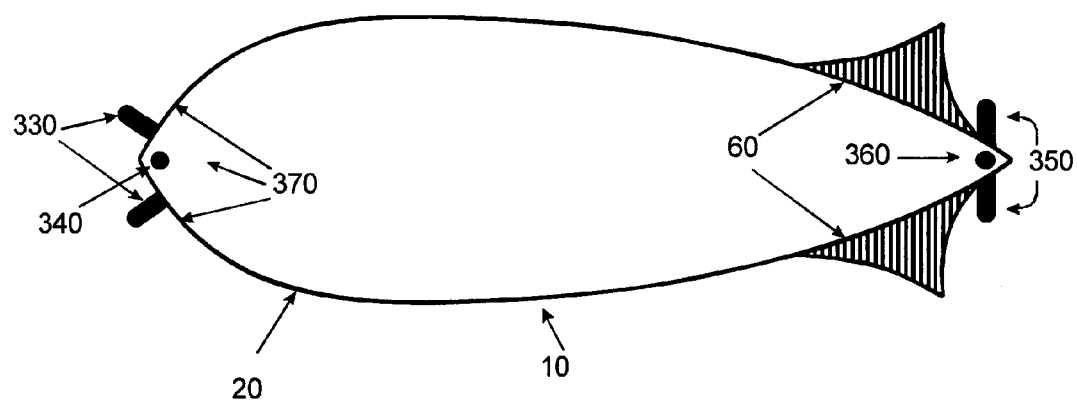
FIG. 3 is a side view of a vessel with nose and tail thrusters.
Figure 4:
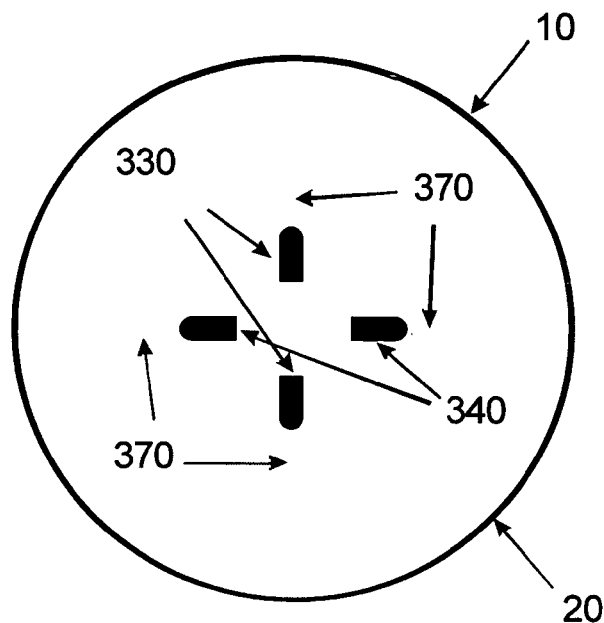
FIG. 4 shows an arrangement of cycloidal thrusters on the nose of an airship.
Figure 5:
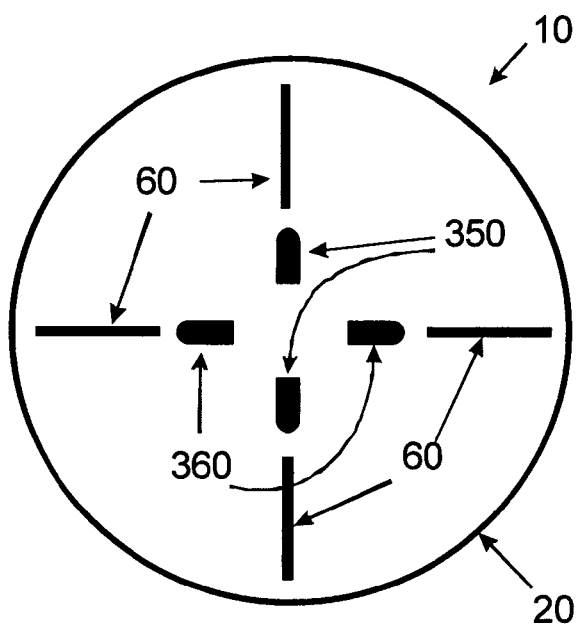

An alternative propulsion arrangements are shown in FIGS. 3, 4, and 5. Cycloid propellers as described in Voith (U.S. Pat. No. 1,922,606) are located on the airship 10. In FIG. 4, two pairs, the front vertical propellers 330 and the front horizontal propellers 340 are located near the front 40. In FIG. 5 another two pairs, the tail vertical propellers 350 and tail horizontal propellers 360 are located near the tail. In one embodiment, the front propellers 330 and 340 are mounted such that their axes of rotation are perpendicular to the envelope 20 and the tail propellers 350 and 360 are mounted such that their axes of rotation are perpendicular to the central axis of the airship 10.

During cruise flight, all of the cycloidal propellers are controlled to direct their thrust rearward and thus provide forward thrust. The front propeller pairs 330 and 340 will accelerate the air stream along the surface of the envelope 2. The increased velocity of the airstreams will create an aerodynamically induced reduction in the gas pressure on the immediately downwind portions 370 of the envelope 20.

In one embodiment, the thrust from each pair of propellers is changed in tandem. If the horizontal propellers pairs 340 and 360 are controlled to produce thrust in the same vertical direction, then the net thrust will create lift that can be used to translate the airship 10 along the vertical axis. If the horizontal propeller pairs 340 and 360 are controlled to produce thrust in opposite vertical directions, then the net force will create a pitching moment about the lateral axis.

If the vertical pairs of propellers 330 and 350 are controlled to produce thrust in the same lateral direction, then the net thrust will create thrust that can be used to translate the airship 10 sideways along the lateral axis. If the vertical propeller pairs 330 and 350 are controlled to produce thrust in opposite lateral directions, then the net force will create a yawing moment about the vertical axis.

In another embodiment, all of the cycloidal propellers 330, 340, 350, and 360 can have their direction of thrust altered independently. Independent thrust control allows for creating a roll moment around the longitudinal axis of the airship 10 as well as all of the translation and rotational control functions available in the linked-pairs arrangement described immediately above.

FIG. 6 shows an alternative "X" shaped arrangement of the tail fins in order to provide greater clearance from and less aerodynamic interference with the propeller pairs 350 and 360.

FIG. 7 shows an alternative embodiment of the pressure equalization chambers. This configuration is more appropriate for airships using a lifting gas such as helium where it is inappropriate to have a vent that permits the movement of air into the entire internal volume of the airship 10.

The nose membrane 170, intermediate membrane 180 and ambient membrane 190 are in the same location as described for FIG. 1. Likewise, the nose vent 200, intermediate vent 210, ambient vent 220 and main vent 230 are also unchanged in both location and function.

The nose ballonet membrane 370 separates the nose chamber 130 from the nose gas chamber 135. Pressure changes that occur at the nose vent 200 are effective communicated via the air filled nose chamber 130 to the nose gas chamber 135. In this configuration, the nose chamber 130 acts in the manner comparable to a conventional blimp ballonet.

The intermediate ballonet membrane 380 separates the intermediate chamber 140 from the intermediate gas chamber 145. Pressure changes that occur at the intermediate vent 210 are effective communicated via the air filled intermediate chamber 140 to the intermediate gas chamber 145. In this configuration, the intermediate chamber 140 acts in the manner comparable to a conventional blimp ballonet.

The ambient ballonet membrane 390 separates the ambient chamber 150 from the ambient gas chamber 155. Pressure changes that occur at the ambient vent 220 are effectively communicated via the air filled ambient chamber 150 to the ambient gas chamber 155. In this configuration, the intermediate chamber 150 acts similarly to a conventional blimp ballonet.

The main ballonet membrane 400 separates the main chamber 160 from the main gas chamber 165. Pressure changes that occur at the main vent 230 are effective communicated via the air filled main chamber 160 to the main gas chamber 160. In this configuration, the intermediate chamber 160 acts in the manner comparable to a conventional blimp ballonet.

A number of embodiments of the invention have been described. Nevertheless, it will be understood that various modifications may be made without departing from the spirit and scope of the invention. For example, the principles of the invention are applicable to vessels other than lighter-than-air airships. Accordingly, other embodiments are within the scope of the following claims.

What is claimed is:

1. A system for reducing hoop stresses in an airship, comprising an enclosed vessel, said vessel having a fore portion and a rear portion and further having an axis running from said fore portion to said rear portion; and said vessel comprising a flexible skin having an inside surface and an outside surface, said vessel further comprising a plurality of membranes disposed along said fore to aft axis each of which said membranes is attached to a respective perimeter of said skin normal to said fore to aft axis thereby defining a sequence of chambers each of which is defined by a portion of the said flexible skin and at least one membrane; and wherein said chambers are vented chambers and wherein each vented chamber has a bi-directional controllable valve disposed between the inside of said vented chamber and the outside surface of the said flexible skin defining the said vented chamber and said valve being operable to equalize gas pressure between the said inside of said vented chamber and said portion of the outside surface of said flexible skin surrounding said chamber at the said valve.

2. The system of claim 1 wherein each of said bi-directional valves further comprise a control to individually open and to close the vent.

3. The system of claim 1 wherein each of a plurality of said gas-tight chambers further comprises a ballonet.

4. A method of reducing stresses in an enclosed vessel comprising providing a vessel having a flexible skin enclosing said vessel, said vessel having an inside and an outside, further providing a plurality of gas-tight chambers on the inside of said vessel wherein at least a portion of each said chamber is proximate said flexible skin, each of said chambers having an inside, further providing each of said chambers with a separate bi-directional valve connecting the said inside of said plurality of chambers with the said outside of the enclosed vessel at a point on each of said plurality of chambers proximate said flexible skin; and equalizing an inside pressure of said chambers with an outside pressure of said vessel at said point by means of said bi-directional valve.

5. The method of claim 4 wherein each said bi-directional valve further comprises a separate control to open and to close the said bi-directional valve.

6. An airship having a fore portion and an aft portion and a longitudinal axis running from said fore portion to said aft portion; said airship enclosed in a flexible skin having an inner surface and an outer surface; said airship further divided into a plurality of sections by a plurality of nested membranes, said nested membranes attached to said skin substantially tangent to said skin and about a perimeter of said skin which perimeter defines a plane substantially normal to said longitudinal axis and wherein said membranes have a surface area larger than the said plane defined by said perimeter.

7. The airship of claim 6 further comprising a plurality of bidirectional controllable valves; further comprising at least three of said sections; and wherein said sections each have one of said bidirectional valves disposed between each said section and the said outer surface on the said perimeter surrounding said section, each of said plurality of bidirectional controllable valves operable to enable gas flow between an individual section and the said outer surface and operable to equalize the gas pressure within said section and the gas pressure on the said outer surface of the said flexible skin proximate said section.

* * * * *